United States Patent Office 3,049,924
Patented Aug. 21, 1962

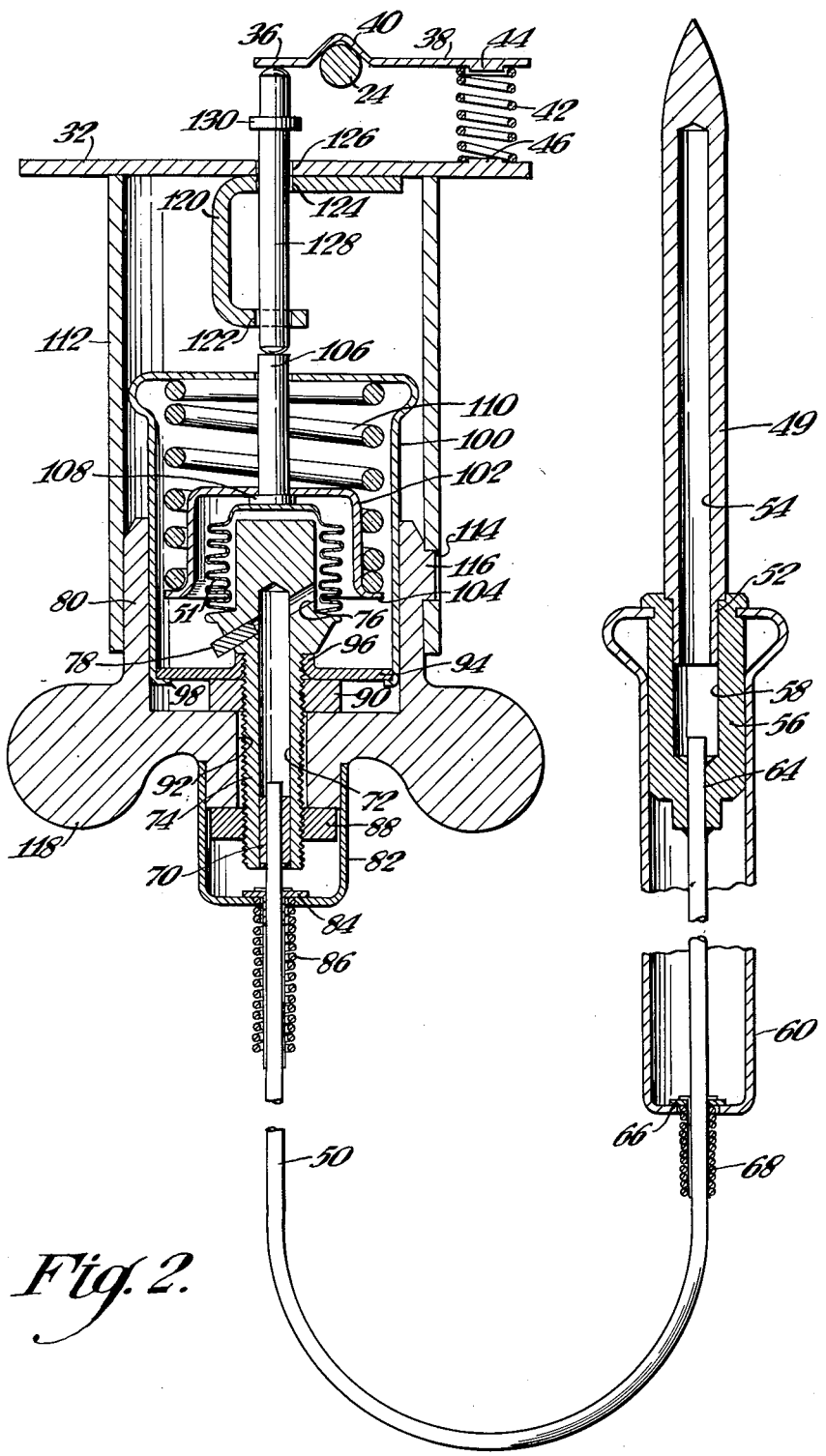

3,049,924
TEMPERATURE INDICATING DEVICE
Victor Weber, Greensburg, and William J. Russell, Williston, Pa., assignors to Robertshaw-Fulton Controls Company, Richmond, Va., a corporation of Delaware
Filed Oct. 14, 1958, Ser. No. 767,233
6 Claims. (Cl. 73—368)

This invention relates to temperature indicating devices and more particularly to devices for indicating the internal temperature of meat or like material.

The advantages of cooking meat in accordance with the internal temperature thereof, as opposed to cooking in accordance with the duration of time during which the meat is kept in a heated oven, have long been well known. To do this, it is highly desirable to provide some means for indicating the temperature of the interior of the meat and to position such an indicator externally to the oven to eliminate the necessity for the cook to frequently open the oven door for inspection of the indicating device. Furthermore, especially when gas ovens are being used, it is further desirable to eliminate as many electrical connections as possible.

It is a general object of this invention to indicate the internal temperature of a material, such as meat, being heated or cooked in a heating appliance.

Another object of this invention is to permit a temperature sensing means to be connected to or disconnected from the indicating means by a simple manual operation without the use of tools.

A further object of this invention is to mechanically interconnect an indicating means positioned externally of an enclosure with a temperature sensing means positioned internally of the enclosure and responsive to the internal temperature of the meat or like material in said enclosure.

Further objects and advantages of this invention will be apparent from the following description taken in connection with the accompanying drawings wherein:

FIG. 2 is a partial longitudinal cross-section through a detail shown in FIG. 1.

Figure 1:
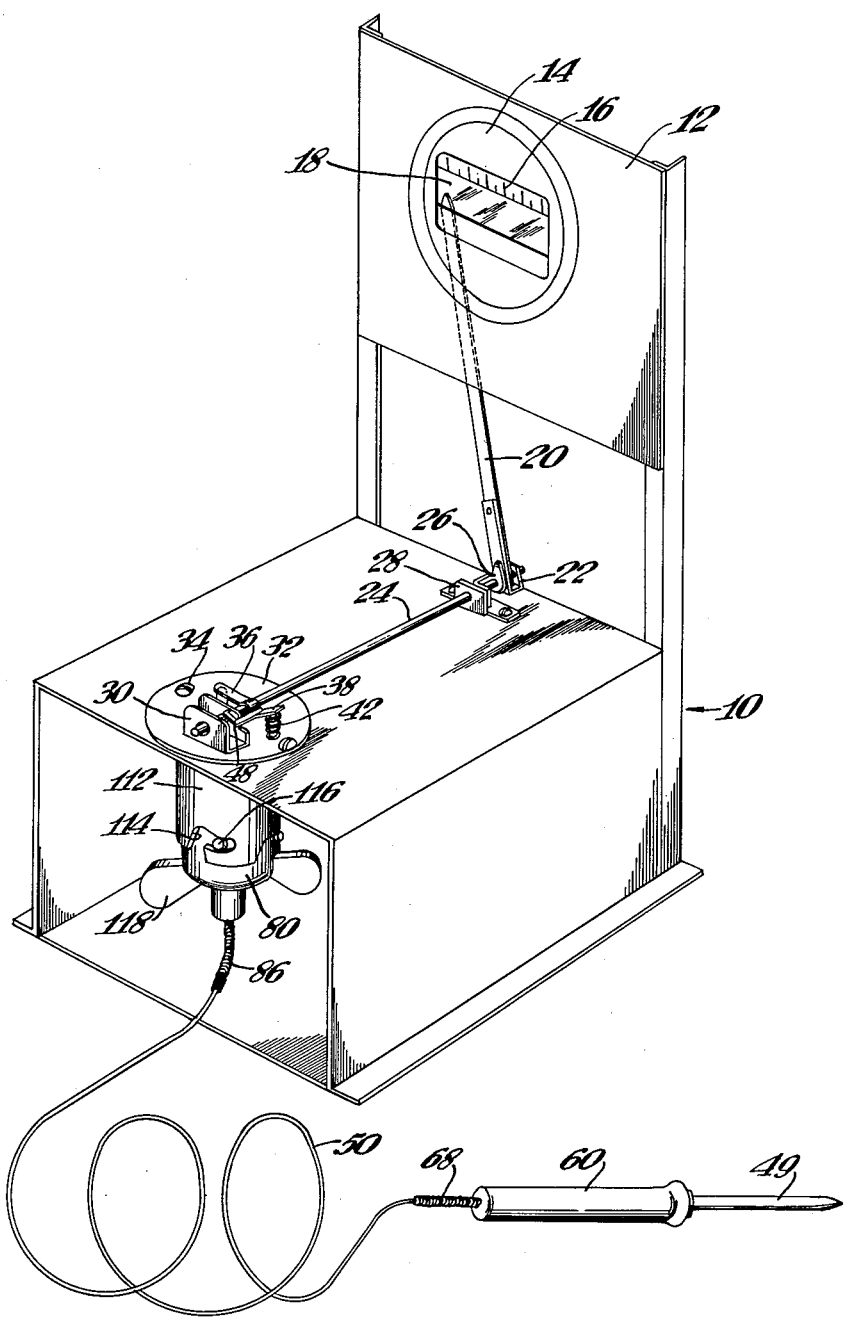
FIG. 1 is an isometric view containing an embodiment of this invention.

Referring now to the drawings, reference numeral 10 generally refers to a stand which is shown merely for the purpose of illustrating the spaced interrelationship between various parts as hereinafter described. It should be understood that this invention can be applied to an oven by obvious means. An upstanding backsplasher 12 has an indicating plate 14 mounted thereon which comprises indicia 16 disposed adjacent a transparent window 18 through which one end of an indicator 20 may be seen. Indicia 16 may be calibrated into terms of temperature or degree of rarity of the meat, or both. The lower end of indicator 20 is formed with a U-shaped portion 22 through which one end of a movable member, comprising a rotatable shaft 24, passes. Shaft 24 passes through a connector 26 which is affixed thereto and has a radially projecting portion which engages the lower end of indicator 20 so that indicator 20 moves or rotates with shaft 24. A pair of bearings 28 and 30, supported on stand 10 and plate 32, slidably receive and support shaft 24. Bearing 30 is mounted on a circular plate 32 connected by a plurality of screws 34 to stand 10. A pair of arms 36 and 38 are welded to shaft 24 at 40 and extend in substantially opposite radial directions on either side of the axis of rotation of shaft 24. A helical spring 42 is disposed between plate 32 and arm 38 and tends to bias shaft 24 and indicator 20 for movement in a counter-clockwise direction. A pair of lugs or projections 44 and 46 are formed on arm 38 and plate 32, respectively, and prevent spring 42 from slipping out of position between arm 38 and plate 32. An arm 48 extends from arm 38 in a direction substantially parallel to the axis of shaft 24 and is then bent inwardly behind a portion of bearing 30 to prevent shaft 24 from sliding axially out of bearings 28 and 30.

Thermally responsive means are provided which generally comprises a temperature sensing bulb 49, a flexible capillary tube 50, and an expansible bellows 51. Bulb 49 is in the form of a tubular probe and comprises a generally elongated rod-like member having a hollow bore 54 which passes through a collar 52 and terminates in a skewer point which is adapted to be inserted into the interior of a roast. Collar 52 is welded or otherwise secured to the walls of a bore 58 formed in member 56. A hollow tubular handle 60 supports member 56 and bulb 49 in a rigid relationship and has a conventional connecting means 66 mounted thereon for supporting capillary tube 50 and a helically-wound wire protecting sleeve 68 thereon. One end of capillary tube 50 passes through a bore 64 formed in member 56 and has the outer walls thereof suitably secured to member 56 as, for example, by welding. It should be noted that the hollow interior of bulb 49 communicates with the interior of the capillary tube 50.

The other end of capillary tube 50 passes through a plug 70 disposed within bore 72 formed in member 74. Plug 70, the end of capillary tube 50 and the bore 72 are sealed to form a fluid-tight connection. A substantially transverse bore 76 extends through the wall of member 74 and provides communication between the interior of bore 72 and the interior of bellows member 51 which is welded at the open end thereof to member 74. A plug 78 seals a portion of bore 76 through which a charge of temperature sensitive fluid may be charged into the thermally responsive means. It should be noted that a fluid-tight chamber is formed consisting of the interiors of bellows 51, bore 76, bore 72, capillary tube 50, bore 58, and bore 54. A conventional charge of fluid disposed within this chamber, has the characteristic of developing sufficient vapor pressure at a given temperature to cause movement of expansible bellows 51.

A hollow plug 80 has a cup-shaped cap 82 connected to one end thereof. Capillary tube 50 passes through the bottom wall of cap 82 and is connected thereto by a connector 84. A helically-wound wire protective sleeve 86 is also connected to cap 82 by connector 84 in a manner similar to that by which capillary tube 50 is connected to handle 60. A pair of nuts 88 and 90 secures member 74 in plug 80. A disc 94, having a central threaded aperture 96 formed therethrough, is mounted on member 74 adjacent nut 90 and extends outwardly to engage the inwardly flanged end 98 of a cup-shaped cap 100. Another cup-shaped member 102 is disposed on the interior of cap 100 and surrounds bellows 51. A pin 106 is formed at one end with a radially extending flange 108 which is disposed between the end wall of bellows 51 and the end wall of cup-shaped member 102. Pin 106 slidably extends through an aperture formed in the end wall of cap 100. A helical spring 110 provides means for biasing cup-shaped member 102 and pin 106 into an operative engagement with bellows 51 whereby pin 106 moves with bellows 51. Spring 110 extends between the interior of end wall of cap 100 and a flange 104 formed on cup-shaped member 102.

A tubular socket 112 is connected at one end to plate 32 and is provided at the open end thereof with a pair of cam slots 114 adapted to receive a pair of lugs 116 respectively, which project outwardly from plug 80, to secure plug 80 within socket 112 in a bayonet type connection. The plug 80 may be manually disconnected by simply grasping a pair of wing projections 118 formed on plug 80 and rotating it to cause lugs 116 to move within their respective slots 114.

A generally U-shaped bracket 120 is formed with a pair of holes 122 and 124 in substantial alignment with one another and with a hole 126 formed in plate 32. Bracket 120 is suitably secured to plate 32 by welding. A pin 128 is disposed within apertures 122, 124 and 126 and has a stop member 130 formed thereon which generally comprises a radially extending flange.

To place the device in operation, the temperature sensing bulb 49 is inserted into the interior of the meat and plug 80 is connected to socket 112. An increase in the temperature of the bulb 49 causes the fluid enclosed therein to expand. The resultant increase in pressure is transmitted from bulb 49 through capillary tube 50 to bellows 51 and causes the end thereof to move upwardly, as shown in FIG. 2, whereupon the motion transmitting means, which comprises pins 106 and 128, which generally act as motion transmitting members, move upwardly. The upward movement of bellows 51 also causes cup-shaped member 102 to move against the bias of helical spring 110. The upper end of pin 128 engages arm 36 and causes shaft 24 to rotate in a clockwise direction against the bias of spring 42.

Rotation of shaft 24 also causes indicator 20 to rotate therewith through a series of positions wherein the needle end of indicator 20 is in alignment with the indicia 16 corresponding to the temperature of bulb 49. A subsequent decrease in the temperature of bulb 49 causes the fluid enclosed therein to contract whereupon the resultant lower pressure within bellows 51 allows the end thereof to move downwardly, as shown in FIG. 2. Spring 110 causes pin 106 to move downwardly at the same rate as the end of bellows 51 whereas spring 42, biasing arm 36 in a counterclockwise direction, causes pin 128 to move downwardly at the same rate as pin 106 whereupon shaft 24 will rotate in a counterclockwise direction causing indicator 20 to move along indicia 16 towards the lower temperature portion thereof.

It will be apparent that the subject device provides a mechanical linkage between indicator 20 and temperature sensitive bulb 49 so that the need for an electrical connection therebetween is non-existent. Furthermore, this device has the advantage of being selectively removable. It will also be apparent that many changes may be made in the details and arrangement of the parts without departing from the scope of the invention as defined in the appended claims.

We claim:

1. A temperature indicating apparatus for indicating temperatures within an enclosure at a location externally of a wall thereof, comprising in combination, a rotatable member adapted to be mounted externally of the wall, an indicator operable by said rotatable member, means for biasing said rotatable member in one direction, a first housing adapted to depend internally of the wall underlying said rotatable member, a second housing slidably engageable with said first housing, thermally responsive means including an expansible element mounted in said second housing for movement axially thereof and a flexible sensing element projecting from said expansible element, motion transmitting means operable between said expansible element and said rotatable member for moving the latter in another direction to operate said indicator in response to temperature variations at said sensing element, and interengaging elements on said first and second housings effective upon said slidable engagement for establishing a detachable connection therebetween whereby axial movement between said first and second housings is prevented, said thermally responsive means and said second housing thereby forming a unit manually separable from said first housing and adapted for removal from the enclosure.

2. A temperature indicating apparatus for indicating temperatures within an enclosure at a location externally of a wall thereof, comprising in combination, a rotatable member adapted to be mounted externally of the wall, an indicator operable by said rotatable member, means for biasing said rotatable member in one direction, a first housing adapted to depend internally of the wall underlying said rotatable member, a second housing slidably engageable with said first housing, thermally responsive means including an expansible element mounted in said second housing for movement axially thereof and a flexible sensing element projecting from said expansible element, motion transmitting means operable between said expansible element and said rotatable member for moving the latter in another direction to operate said indicator in response to temperature variations at said sensing element, interengaging elements on said first and second housings effective upon said slidable engagement for establishing a detachable connection therebetween whereby axial movement between said first and second housings is prevented, and handle means carried by said second housing, said thermally responsive means and said second housing thereby forming a unit separable by operation of said handle means from said first housing and adapted for removal from the enclosure.

3. A temperature indicating apparatus for indicating temperatures within an enclosure at a location externally of a wall thereof, comprising in combination, a rotatable member adapted to be mounted externally of the wall, an indicator operable by said rotatable member, means for biasing said rotatable member in one direction, a first housing adapted to depend internally of the wall underlying said rotatable member, a second housing slidably engageable with said first housing, thermally responsive means including an expansible element mounted in said second housing for movement axially thereof and a flexible sensing element projecting from said expansible element, motion transmitting means operable between said expansible element and said rotatable member for moving the latter in another direction to operate said indicator in response to temperature variations at said sensing element, interengaging cam slot and detent elements on said first and second housings respectively effective upon said slidable engagement for establishing a detachable bayonet type connection therebetween whereby axial movement between said first and second housings is prevented, and handle means carried by said second housing, said thermally responsive means and said second housing thereby forming a unit separate of operation of said handle means from said first housing and adapted for removal from the enclosure.

4. A temperature indicating apparatus for indicating temperatures within an enclosure at a location externally of an apertured wall thereof, comprising in combination, a rotatable member adapted to be mounted externally of the wall, an indicator operable by said rotatable member, means for biasing said rotatable member in one direction, a first housing adapted to depend internally of the wall underlying said rotatable member, a motion transmitting member operatively associated with said rotatable member and adapted to project through the aperture coaxially of said first housing, a second housing slidably engageable with said first housing, thermally responsive means including an expansible element mounted in said second housing for movement axially thereof and a flexible sensing element projecting from said expansible element, a second motion transmitting member operable between said expansible element and said first member for moving said rotatable member in another direction to operate said indicator in response to temperature variations at said sensing element, means for biasing said second member into operative engagement with said expansible element, and interengaging elements on said first and second housings effective upon said slidable engagement for establishing a detachable connection therebetween whereby axial movement between said first and second housings is prevented, said thermally responsive means and said second housing thereby forming a unit separable from said first housing and adapted for removal from the enclosure.

5. A temperature indicating apparatus for indicating temperatures within an enclosure at a location externally of an apertured wall thereof, comprising in combination, a rotatable member adapted to be mounted externally of the wall, an indicator operable by said rotatable member, means for biasing said rotatable member in one direction, a tubular socket adapted to depend internally of the wall underlying said rotatable member, a stem member for rotating said rotatable member in another direction and adapted to project through the aperture coaxially of said socket, a plug member slidably engageable with said socket, thermally responsive means including an expansible element mounted in said plug member for movement axially thereof and a flexible sensing element projecting from said expansible element outwardly of said plug member, a second stem member operable between said expansible element and the first said stem member for moving the latter to rotate said rotatable member in said other direction to operate said indicator in response to temperature variations at said sensing element, means for biasing said second stem member into operative engagement with said expansible member, and interengaging elements on said socket and plug member effective upon said slidable engagement for establishing a detachable connection therebetween whereby axial movement between said socket and plug members is prevented, said thermally responsive means and said plug member thereby forming a unit separable from said socket and adapted for removal from the enclosure.

6. A temperature indicating apparatus for indicating temperatures within an enclosure at a location externally of an apertured wall thereof, comprising in combination, a rotatable member adapted to be mounted externally of the wall, an indicator operable by said rotatable member, means for biasing said rotatablle member in one direction, a tubular socket adapted to depend internally of the wall underlying said rotatable member, a stem member for rotating said rotatable member in another direction and adapted to project through the aperture coaxially of said socket, a plug member slidably engageable with said socket, thermally responsive means including an expansible element mounted in said plug member for movement axially thereof and a flexible sensing element projecting from said expansible element outwardly of said plug member, a second stem member operable between said expansible element and the first said stem member for moving the latter to rotate said rotatable member in said other direction to operate said indicator in response to temperature variations at said sensing element, means for biasing said second stem member into operative engagement with said expansible member, interengaging cam slot and detent elements on said socket and plug member respectively effective upon said slidable engagement for establishing a detachable bayonet type connection therebetween whereby axial movement between said socket and plug members is prevented, and handle means carried by said plug member, said thermally responsive means and said plug member thereby forming a unit separable by operation of said handle means from said socket and adapted for removal from the enclosure.

References Cited in the file of this patent

UNITED STATES PATENTS

| | | | |
|---|---|---|---|
| 1,599,527 | Hobbs | Sept. 14, | 1926 |
| 2,120,929 | Clifford | June 14, | 1938 |
| 2,197,454 | Smith | Apr. 16, | 1940 |
| 2,358,047 | Birch | Sept. 12, | 1944 |
| 2,364,841 | Eskin | Dec. 12, | 1944 |
| 2,520,872 | Zuehlke | Aug. 29, | 1950 |
| 2,598,351 | Carter | May 27, | 1952 |
| 2,628,501 | Knapp | Feb. 17, | 1953 |
| 2,809,523 | Burling | Oct. 15, | 1957 |
| 2,822,985 | Johnson | Feb. 11, | 1958 |